United States Patent
Tremblay et al.

(10) Patent No.: US 9,240,063 B1
(45) Date of Patent: Jan. 19, 2016

(54) METHODS AND APPARATUSES FOR SIMULATING FLUIDS AND MEDIA IN DIGITAL ART APPLICATIONS

(75) Inventors: Christopher Tremblay, Cantley (CA); Daniel Jette, Seattle, WA (US); Steve Szoczei, Ottawa (CA)

(73) Assignee: COREL CORPORATION, Ottawa (CA)

( * ) Notice: Subject to any disclaimer, the term of this patent is extended or adjusted under 35 U.S.C. 154(b) by 281 days.

(21) Appl. No.: 13/469,041

(22) Filed: May 10, 2012

Related U.S. Application Data

(60) Provisional application No. 61/484,619, filed on May 10, 2011.

(51) Int. Cl.
*G06T 11/40* (2006.01)
*G06T 11/00* (2006.01)

(52) U.S. Cl.
CPC ............... *G06T 11/40* (2013.01); *G06T 11/001* (2013.01)

(58) Field of Classification Search
CPC ... G06T 11/40; G06T 11/001; G06T 2210/24; G06T 13/20; G06T 17/20; G06F 2217/16; G06F 17/5018; G06F 17/5009
USPC ........................................................ 345/424
See application file for complete search history.

(56) References Cited

U.S. PATENT DOCUMENTS

| | | | | |
|---|---|---|---|---|
| 8,296,668 | B1 * | 10/2012 | Song et al. | 715/764 |
| 8,335,675 | B1 * | 12/2012 | DiVerdi et al. | 703/9 |
| 2008/0177519 | A1 * | 7/2008 | Miller et al. | 703/9 |

OTHER PUBLICATIONS

Hang, Chu Siu, "Making Digital Painting Organic", a thesis submitted to Hong Kong University of Science and Technology, Aug. 2007, pp. 1-112.
O'Brien, Patrick, "A Framework for Digital Watercolor", a thesis submitted to Texas A&M University, Aug. 2008, pp. 1-56.

* cited by examiner

*Primary Examiner* — Haixia Du
(74) *Attorney, Agent, or Firm* — The Law Office of Michael E. Kondoudis

(57) ABSTRACT

The present invention relates to digital art software, and more particularly to methods of simulating fluids, brushes and associated media in digital art software applications. According to certain aspects, the invention relates to modeling techniques used to simulate fluids (and gases), which modeling techniques can employ dynamically sized simulation areas. In embodiments, these techniques incorporate modifications made to conventional techniques such as Lattice Bolzmann Modeling (LBM). According to certain other aspects, the invention relates to simulations of media using these techniques for modeling fluids such as Watercolor and "Wet Oil". According to still further aspects, the invention relates to a "tool" adjuster paradigm for digital art software, among other things.

22 Claims, 8 Drawing Sheets

METHODS AND APPARATUSES FOR SIMULATING FLUIDS AND MEDIA IN DIGITAL ART APPLICATIONS

CROSS-REFERENCE TO RELATED APPLICATIONS

The present application claims priority to U.S. Provisional Application No. 61/484,619 filed May 10, 2011, the contents of which are incorporated by reference herein in their entirety.

FIELD OF THE INVENTION

The present invention relates to digital art software, and more particularly to methods of simulating fluids, brushes and associated media in digital art software applications.

BACKGROUND OF THE INVENTION

Existing digital art software products such as ADOBE® PHOTOSHOP® and CORELO® PAINTER® are useful for many applications. However, further improvements are possible, particularly in connection with simulating drawing and painting using fluids such as watercolors and wet oils.

SUMMARY OF THE INVENTION

The present invention relates to digital art software, and more particularly to methods of simulating fluids, brushes and associated media in digital art software applications. According to certain aspects, the invention relates to modeling techniques used to simulate fluids (and gases), which modeling techniques can employ dynamically sized simulation areas. In embodiments, these techniques incorporate modifications made to conventional techniques such as Lattice Bolzmann Modeling (LBM). According to certain other aspects, the invention relates to simulations of media using these techniques for modeling fluids such as Watercolor and "Wet Oil". According to still further aspects, the invention relates to a "tool" adjuster paradigm for digital art software, among other things.

In accordance with these and other aspects, a method implemented by a computer according to embodiments of the invention includes identifying an area of fluid on a computer-simulated surface, the surface comprising a plurality of cells; updating, by the computer, a model associated with the fluid in the identified area, the model comprising a plurality of variables for simulating movement of the fluid between cells in the identified area; determining cells containing wet fluid; and dynamically adjusting the area based on the determined cells containing wet fluid.

In further accordance with these and other aspects, a computer graphics system according to embodiments of the invention includes a processor programmed with digital art software instructions, which when executed by the processor cause the processor to perform a method comprising identifying an area of fluid on a computer-simulated surface, the surface comprising a plurality of cells; updating, by the computer, a model associated with the fluid in the identified area, the model comprising a plurality of variables for simulating movement of the fluid between cells in the identified area; determining cells containing wet fluid; and dynamically adjusting the area based on the determined cells containing wet fluid.

In yet further accordance with these and other aspects, a method for providing a heads up display in a computer graphics system according to embodiments of the invention allows adjustments to be made to a tool for use in the computer graphics system, the method comprising: activating the heads up display in response to a user input; allowing a first state of tool adjustments to be performed using the heads up display; detecting a requested state change based on user input; maintaining uninterrupted activation of the heads up display after the detected state change request; and allowing a second different state of tool adjustments to be performed using the heads up display.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The present invention relates generally to digital art software, and more particularly to methods of simulating fluids, brushes and associated media in digital art software applications.

According to certain aspects, embodiments of the invention include novel modeling techniques that are used to simulate fluids (and gases), which modeling techniques can employ dynamically sized simulation areas. According to certain other aspects, embodiments of the invention include using these novel modeling techniques to simulate drawing/painting using fluids such as Watercolor and Wet Oil and media such as brushes. According to still further aspects, the invention relates to a "tool" adjuster paradigm for adjusting certain drawing or painting variables in a digital art software program, among other things.

These and other aspects will be described in more detail below. In general, however, an overall computerized drawing/painting simulating method in which aspects of the invention can be implemented is illustrated in FIG. 1.

Figure 1:
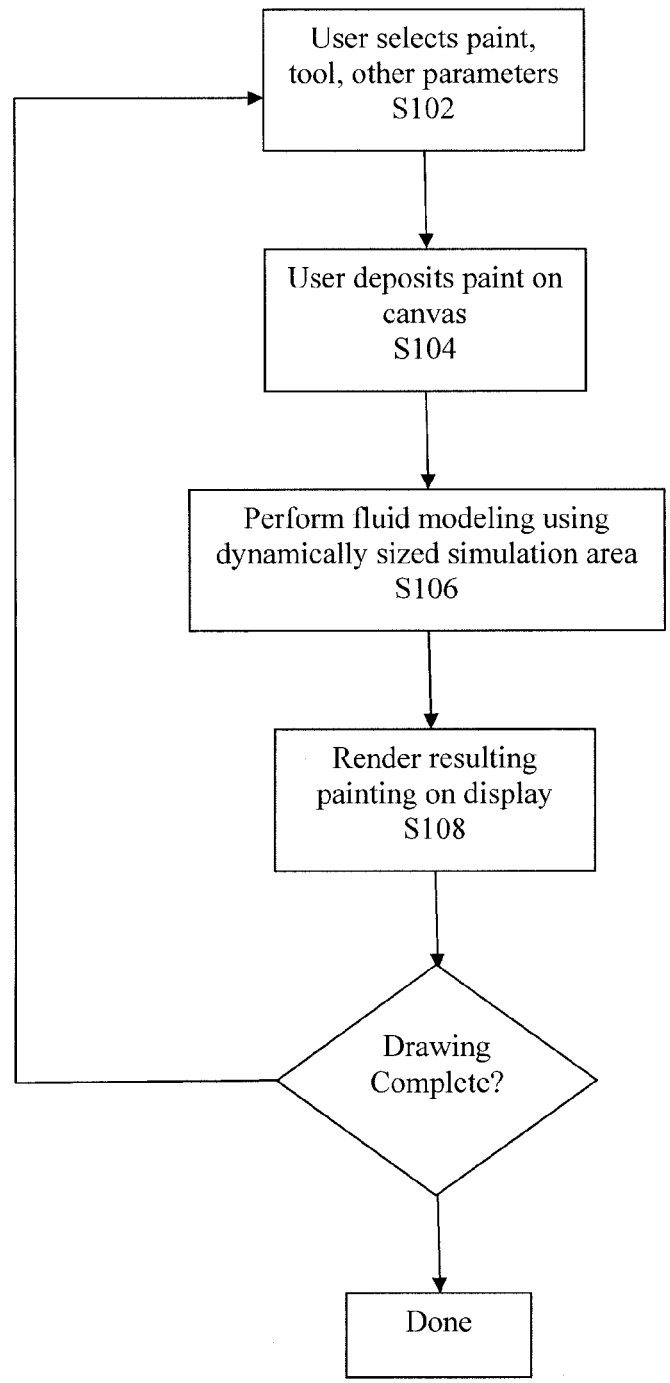
FIG. 1 is a flowchart illustrating an example methodology in which aspects of the present invention can find an example implementation.

As shown in FIG. 1, a first step S102 includes allowing a user to select a fluid type, color, drawing/painting implement, and other drawing parameters, and to set an initial drawing surface/area or canvas (e.g. a new canvas or an existing canvas retrieved from a file). In a next step S104, drawing simulation begins by allowing a user to deposit fluid on the canvas using the selected color, drawing/painting implement, etc. This depositing step can include applying various effects to simulate actual drawing and painting effects that are appropriate for the type of fluid being used. In a next step S106, fluid modeling simulation is performed to model the behavior of the fluid deposited. This step includes using a dynamically sized simulation area to limit the amount of simulation that needs to be performed. This step can also include applying various formulas and effects to adjust how the model is changed at each iteration. This step also includes updating the current fluid model. In a next step S108 an updated rendering of the canvas is performed to reflect the newly deposited fluid, as changed by the fluid modeling simulation. Processing continues until the drawing is complete.

It should be noted that, in additional or alternative embodiments, the simulation in step S106 can be iteratively performed until the simulation is complete. For example, the simulation can also optionally loop back to step S102 or step S104 depending on the user action where the user would be adding more media to the simulation. Moreover, if the user adjusts the paint tool, or selects a different tool before adding more media, the process could loop back to step S102. If however the user simply adds more media, the simulation could loop back to step S104. It should be apparent that many further alternatives are possible.

The present inventors recognize that conventional modeling techniques such as Lattice Boltzmann Modeling (LBM, see, e.g. Sukop and Thorne, "Lattice Boltzmann Modeling: An Introduction for Geoscientists and Engineers," (2007)) have the ability to model the behaviors of fluids on a flat surface by computing values for variables such as fluid pressure, velocity vectors, etc. The values are computed for a grid of cells, in each of which a relative amount of fluid exists. Moreover, the simulation can be performed iteratively at steps which can correspond to specific time intervals. In general, at each step the movement of fluid between cells during the interval is computed (conventional LBM allows for movement of fluid from one cell to an adjacent cell in each of eight different directions), and collisions of fluid between cells are resolved. Thereafter, simulated fluid data (e.g. values for pressure, velocity, etc.) is updated for each of the cells. The simulation steps are iteratively repeated until (a) a predetermined number of steps is reached and/or (b) a condition that can be measured occurs (e.g. stability in the fluid velocities in each cell). Alternative techniques can also account for evaporation, in which the fluid completely disappears.

The present inventors further recognize, however, that conventional modeling techniques such as LBM have various shortcomings that limit their use in digital art software applications and otherwise. For example, conventional LBM uses a fixed size simulation, such as a fixed grid of 512×512 cells, wherein simulation computations are iteratively performed for each and every single cell at each iteration, even if no fluid exists at that cell, or if the fluid in the cell has reached a steady state or has evaporated or become absorbed into a surface material. The present inventors still further recognize that it would be desirable to allow the simulation to have dynamically adjusted sizes. For example, it may be desirable to allow increases in the grid size, to accommodate simulations using increased resolutions within the same simulation grid or to expand the current simulation grid by brushing outside of it. It is also desirable for performance reasons to be able to dynamically decrease the size of a simulation area so as to dynamically process the minimum area possible.

According to certain aspects, therefore, embodiments of the invention provide new and useful modeling techniques that enable dynamically adjustable simulation areas and sizes. These will be described in more detail below in examples where a conventional modeling technique such as LBM is modified with new features and capabilities. Those skilled in the art will understand how to implement the invention by modifying other conventional techniques or otherwise after being taught by the following examples.

One example modeling technique according to the invention is referred to as "wet rectangle (simulation area)". This includes determining the smallest enclosing rectangle encompassing cells in which the fluid being simulated is currently wet. Although this technique is described herein in terms of an example shape of a rectangle, it will be appreciated that many other shapes are possible, and the invention is not limited to this example shape.

FIGS. 2A to 2D illustrate an example method of performing this "wet rectangle" technique according to embodiments of the invention.

Figure 2A:
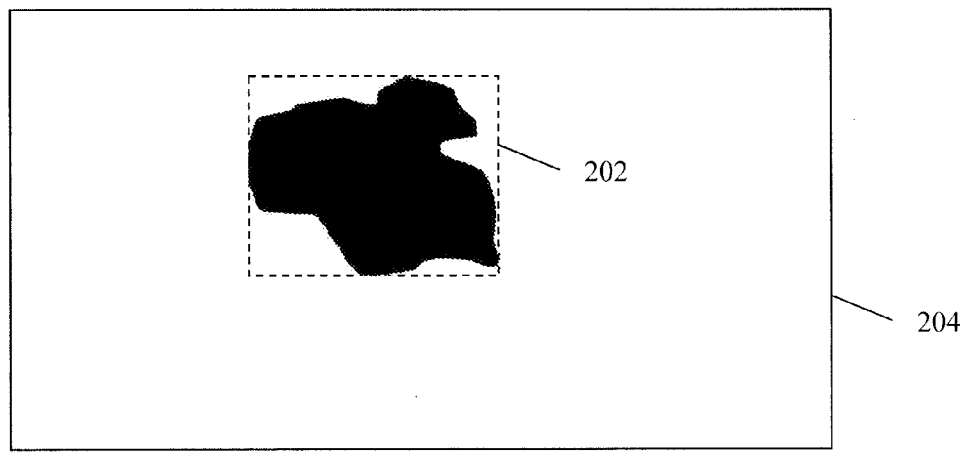
FIGS. 2A to 2D illustrate one example technique of dynamically sizing a simulation area according to embodiments of the invention.
Figure 2B:
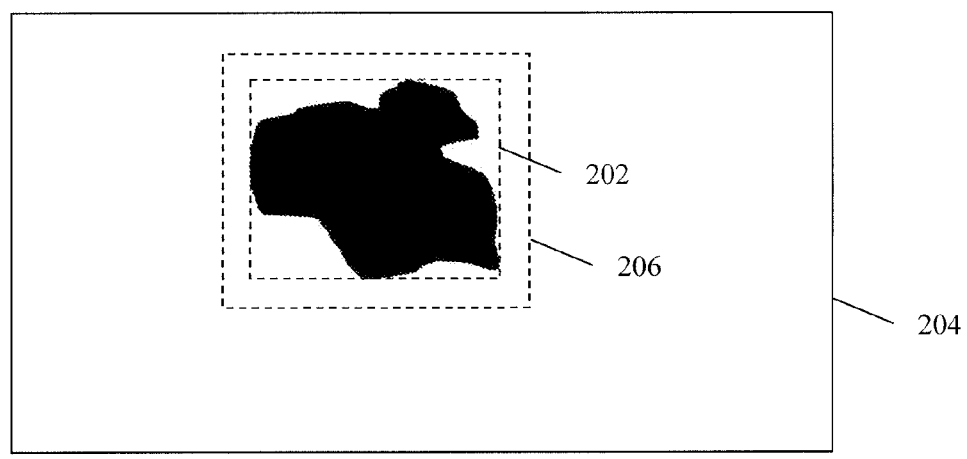
Figure 2C:
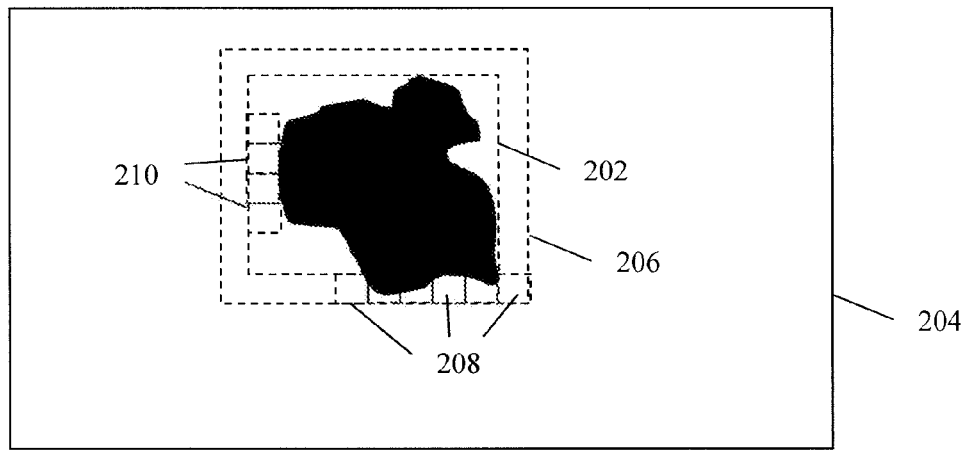
Figure 2D:
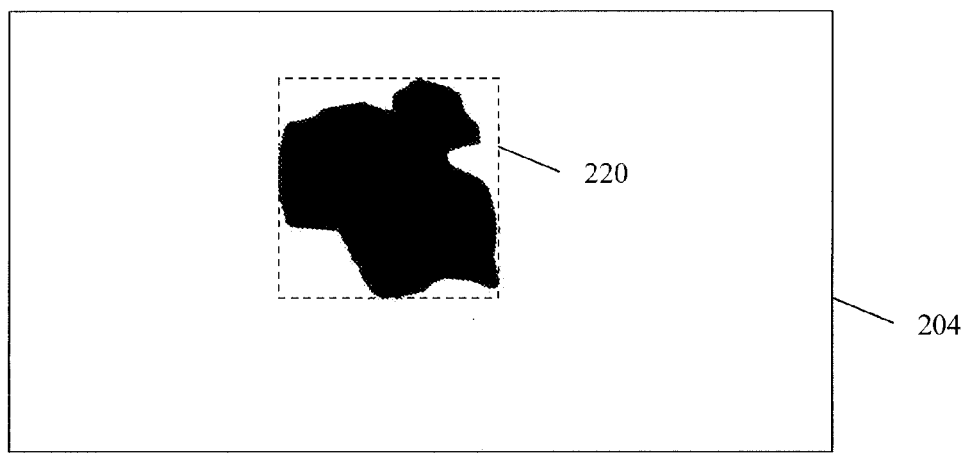

As shown in FIG. 2A, new fluid is deposited onto a drawing area 204, and a closest fitting rectangle 202 of cells around this fluid is identified. Next, as shown in FIG. 2B, when using a modeling technique such as LBM, before the next step of the simulation, "dry cells" 206 are added around the rectangle 202 to allow the fluid to flow into the new dry cells. In this example, one cell outside all the cells along the boundary of rectangle 202 is added to accommodate LBM, which allows for fluid to flow into one adjacent cell at each iteration. However, other alternatives are possible. As mentioned above, and as will be described in more detail below, during any given iteration of the simulation, some dry cells can become wet (e.g. cells 208 in FIG. 2C) and some wet cells can become dry (e.g. cells 210). Accordingly, at the end of the current simulation step, as shown in FIG. 2D the wet rectangle is updated to be the smallest rectangle 220 enclosing all the currently wet cells.

Another example modeling technique according to the invention is referred to as "wet spans." This technique builds upon the recognition that the wet rectangle described above has multiple lines of cells, and certain of these lines may contain no or just a few cells with fluid. According to aspects of the invention, wet spans can be used to skip sections of cells in the simulation processing, thereby improving performance.

FIGS. 3A to 3D illustrate an example method of implementing this "wet spans" technique according to embodiments of the invention.

Figure 3A:
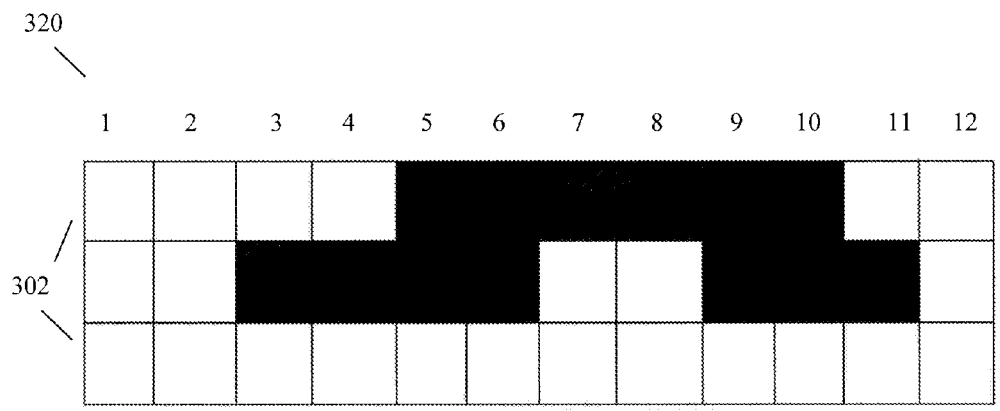
FIGS. 3A and 3B illustrate another example technique of dynamically sizing a simulation area according to embodiments of the invention.
Figure 3B:
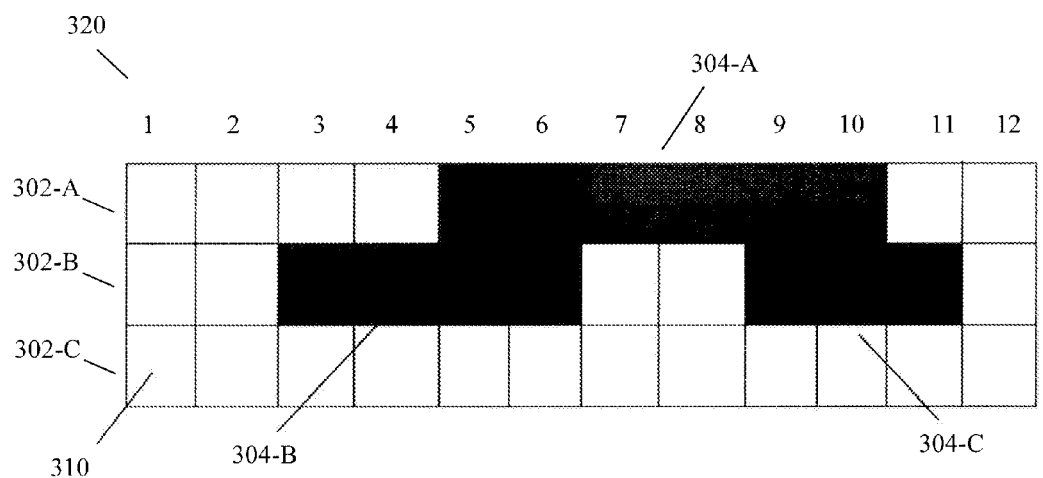

FIG. 3A shows three lines of a 12×12 wet rectangle 320 such as that formed in the technique described above in connection with FIG. 2D. As shown in FIG. 3A, this rectangle 320 includes lines 302 of cells. In this technique, the invention determines a wet span which is a data-structure that holds a "start" and an "end" point of wet cells on each line of the wet rectangle. A single line of cells can have zero, one or multiple wet spans. For example, as shown in FIG. 3B, line 302-A includes a single wet span 304-A that begins at cell 5 and ends at cell 10, line 302-B includes two wet spans 304-B and 304-C, the first of which begins at cell 3 and ends at cell 6 and the second of which begins at cell 9 and ends at cell 11. As further shown in FIG. 3B, line 302-C includes no wet spans. A data structure formed in this example would have three entries corresponding to wet spans 304-A, 304-B and 304-C, each entry identifying the line 302 in which it occurs, as well as the starting and ending cells.

According to aspects of the invention, wet spans can be used to skip sections of cells in the simulation processing. As discussed above, using LBM simulation for example, the wet span information of three touching lines of the wet rectangle are examined to determine what cells can be skipped. Accordingly, by examining the wet span information in the example shown in FIG. 3B, no simulation processing would be needed for cell 310 because it is a cell that is not included in any wet spans and no adjacent spells belong to any wet spans.

A further example modeling technique according to the invention is referred to as "wet tiles." The present inventors recognize that further performance improvements can be made by processing the simulation space in tiles. Taking memory considerations aside (because using tiles for memory improvements is not a new concept), an advantage of using "wet tiles" is that it is possible to keep track of the tiles that contain wet cells in the flow simulation. In addition, it is possible to keep track of the tiles where the user is adding more fluid even if this fluid is not yet included in the simulation.

Figure 4:
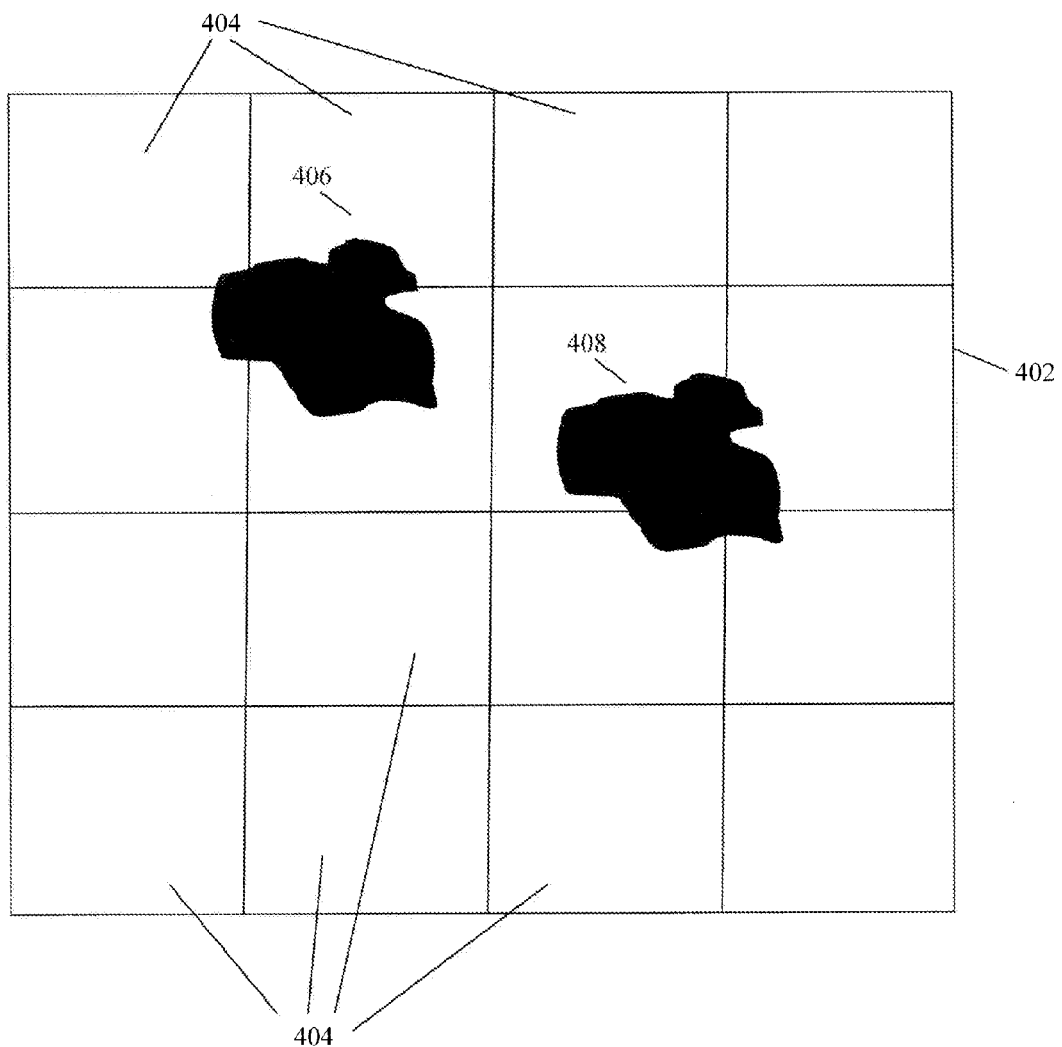
FIG. 4 illustrates another example technique of dynamically sizing a simulation area according to embodiments of the invention.

An example of wet tiles is shown in FIG. 4. As shown in this example, the entire canvas 402 available for use by a user is divided into tiles 404. As further shown, only two portions 406, 408 of the canvas currently contain wet cells. Accordingly, in this technique, the invention identifies wet tiles by identifying which of tiles 404 currently include one or more wet cells. According to aspects of the invention, processing for tiles other than wet tiles can be skipped, as long as there are no neighboring wet tiles, such as tile 404 in the bottom left corner of the canvas in FIG. 4.

In addition to the above concepts, tiles can be further divided in chunks to allow processing on several processing units. By having separate source and destination tiles the flow simulation of the invention can be performed effectively in simultaneous processing chunks.

As mentioned above, embodiments of the invention provide new and useful drawing/painting simulation functionalities using the fluid modeling techniques described above. These and other inventive functionalities will be described in more detail below in connection with two popular types of fluids for painting applications—watercolor and wet oil. However, the invention is not limited to these types of fluids and those skilled in the art will understand how to implement the invention using other types of fluids after being taught by these examples.

Embodiments of drawing/painting simulation according to the invention use a multi-layer scheme. This "multi-layer" scheme is not, by itself, an aspect of the present invention, but its inclusion in the drawing/painting simulation methods of the present invention is considered preferable. In these and other embodiments, the model uses three layers. In general, the layers can have different total numbers of cells; however, each cell in the layer in which simulation is performed at least has a corresponding cell in the other layers.

A first layer in this multi-layer scheme is referred to as a surface layer. This is where the user can use a computer graphics tool, such as a "brush" to deposit media. Accordingly, the surface layer includes a total number of cells corresponding to the entire possible drawing/painting area (i.e. an entire simulated canvas). In a watercolor example, the media can consist of water and/or pigments. It is possible to have more than one kind of pigment in the fluid being deposited. It is still further possible to also have computer generated deposition. For example, random drips of media could be deposited on the surface layer over a period of time.

A second layer is referred to as a flow layer. This is where the fluid simulation such as that described above is executed. At each step of the iterative simulation, some of the media from the surface layer can be transferred into the flow layer and therefore added to the simulation. In addition to running the fluid simulation, pigment in the fluid is moved along with the fluid in the flow layer using velocity information given from the simulation.

A third layer is referred to as a dry layer. As the water from the flow layer evaporates, pigment in the fluid gets transferred from the flow layer to the dry layer. This process can incorporate various effects to be described in more detail below such as pigment granulation in the paper texture. In addition, some of the pigment on the dry layer can be lifted and reintegrated into the flow layer.

One example method of performing drawing/painting simulation according to aspects of the invention will now be described in connection with watercolor as the simulated fluid. This example method is represented in the flowchart of FIG. 5.

In a first step S502, watercolor is deposited on the drawing surface/area (e.g. by a user causing a paint brush having a selected color to be applied to a digital canvas in a computer art software application). Certain watercolor embodiments of the invention include at least five different deposition methods that can be selected and/or used by the user in this step: Real Wet Buildup; Real Wet Cover; Real Wet Replace; Real Dry Buildup; Real Dry Cover. In general, the first three of these methods have water and pigment, and deposit these on the surface layer (i.e. the user can always adjust the wetness or concentration to get water only or pigment only). The last two have pigment only and deposit directly into the dry layer (i.e. skipping the whole fluid simulation).

In embodiments, the Real Wet Buildup deposition method includes causing more and more pigment to be applied to the surface layer in locations where the brush is repetitively applied. In these and other embodiments, the Real Wet Cover deposition method includes causing more and more pigment to be applied to the surface layer in locations where the brush is repetitively applied, but only up to a predetermined limit. In these and other embodiments, the Real Wet Replace deposition method includes causing pigment that is currently associated with the brush to replace whatever different pigment exists on the surface layer in locations where the brush is repetitively applied. In embodiments, the Real Dry Buildup deposition method includes causing pigment to be applied directly to the dry layer in locations where the brush is being applied. In embodiments, the Real Dry Cover deposition method includes causing more and more pigment to be applied directly to the dry layer in locations where the brush is repetitively applied, but only up to a predetermined limit.

Figure 5:
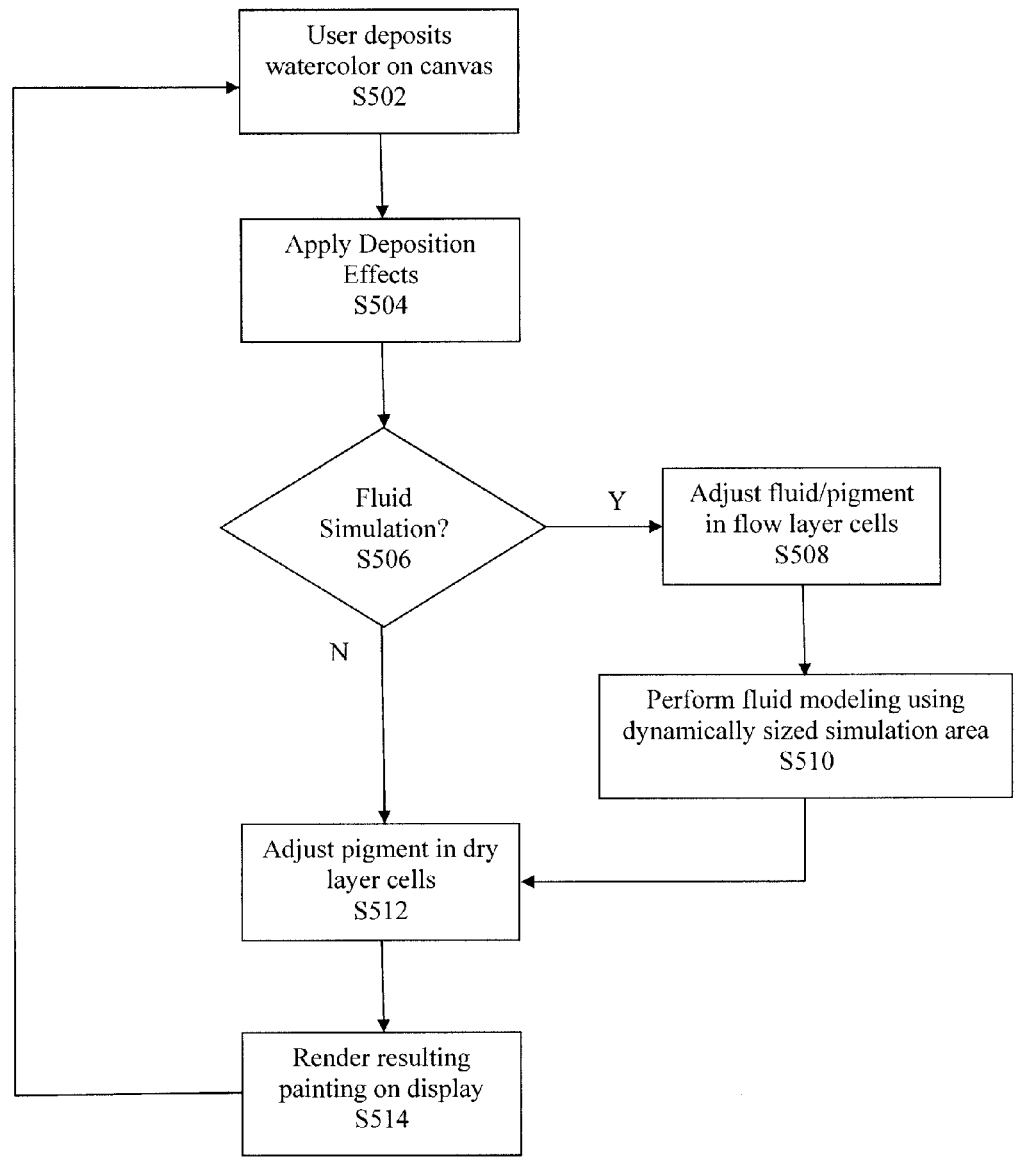
FIG. 5 is a flowchart illustrating an example methodology for performing painting simulation using watercolors and fluid modeling techniques according to embodiments of the invention.

In embodiments such as that illustrated in FIG. 5, step S504 allows the user to control various additional parameters to get various effects for how the fluid and/or pigment is deposited. Example controls according to these and other embodiments of the invention (for deposition) include wetness and concentration. Example wetness effects control the relative amount of fluid that is deposited on the surface layer for each brush action. Example concentration effects control the relative amount of pigment that is deposited per amount of fluid. Accordingly, for example, if blue is the selected pigment color, concentration effects control the shade of blue that results after each action a brush is applied to the canvas (i.e. deeper shades for higher levels of concentration).

In a next step S506 of an example method as shown in FIG. 5, it is determined whether a fluid simulation interval is to be performed. It should be noted that the timing of simulation can be controlled separately from other steps, but this is not necessary in all embodiments. For example, the user can manually cause the simulation to be paused, or simulation can be paused automatically while the user is actively engaged in a series of deposition actions that are performed close together in time.

If simulation is to be performed, a next step S508 includes adjusting the amount of fluid and/or pigment in each of the cells in the flow layer. For example, some or all of the media (fluid and pigment) recently deposited onto the surface layer can be transferred into the flow layer and therefore added to the simulation. In addition, some of the pigment already existing on the dry layer can be lifted and reintegrated into the flow layer. When combining pigments between cells, the pigments are combined together. In embodiments, pigments of respective types are combined together. For example, there can be three pigment types, but there could easily be more than three pigments. In this example, cyan pigment is added to cyan pigments, yellow pigments are added to yellow pigments, and magenta pigments are added to magenta pigments. As should be apparent, this example does not work directly with colors, rather it works with pigments as "units" or "quantity" of a specific pigment. So, for example, when pigment is lifted from the dry layer, the pigment is combined with the pigment in the flow layer. Eventually, the pigment will typically get rendered to RGB. For this, embodiments can use a subtractive pigment model such as CMY, or a more advanced pigment model such as Kubelka-Munk.

After the fluid and/or pigment in the cells in the flow layer are adjusted, a next step S510 includes performing fluid simulation according to the invention as described above. It should be noted that, in addition to performing the dynamically sized simulation as described above, the fluid simulation formulas such as those included in LBM (e.g. controlling such variables as velocity, pressure, etc.) can be further adjusted according to watercolor embodiments of the invention help to achieve various effects in watercolor, such as creating watercolor washes, dry media on wet paper, wet on dry, wet on wet etc. In embodiments, these effects can be selected/adjusted by the user. Accordingly, step S510 can include determining the effects to be used and adjusting the simulation formulas accordingly. In addition to running the fluid simulation, pigment in the fluid is moved along with the fluid in the flow layer using velocity information given from the simulation.

In a next step S512, regardless of whether simulation is performed, the method includes adjusting the amount of pigment in the dry layer if necessary. This step recognizes that as the water from the flow layer evaporates, pigment in the fluid gets transferred from the flow layer to the dry layer. The rate of evaporation can be controlled by parameter, for example. Moreover, this process can incorporate various pigment effects such as pigment granulation in the paper texture, which effects can also be selected and/or controlled by a user.

For example, pigment effects include: Settling rate (i.e. how fast pigment settles from flow layer to dry layer, this can be considered as staining strength); Pigment weight (i.e. how easily pigment can stay in suspension instead of settling); Granulation (i.e. how much pigment settles based on surface texture, etc.). It should be noted that parameters for pick up (vs. glazing where there is no pickup) that can be used in step S508 can also be defined by a user.

In a next step S514, the results are used to cause the current canvas to be rendered on the screen. In embodiments, all the pigments at corresponding cells from the three layers are combined, (with or without water, the formulas are different) and the result is rendered to the screen. It should be noted that this step may include translating from one color space to another. For example, if pigment values are calculated in the simulation steps using a Kubelka-Munk model or a CMY model, and the display graphics uses RGB, a conversion from Kubelka-Munk to RGB or CMY to RGB may need to be included in this step.

Another example method of performing drawing/painting simulation according to aspects of the invention will now be described in connection with wet oil as the simulated fluid. This simulation also uses a three layer scheme similar to that described above. However, in general, instead of using a pigment model, the oil uses "alpha" and alpha blending. The pixel model for performing alpha blending can be based on RGB or other color spaces. According to aspects of the invention described in more detail below, alpha blending and other effects are combined with LBM to achieve the look given by the wet oil media.

Figure 6:
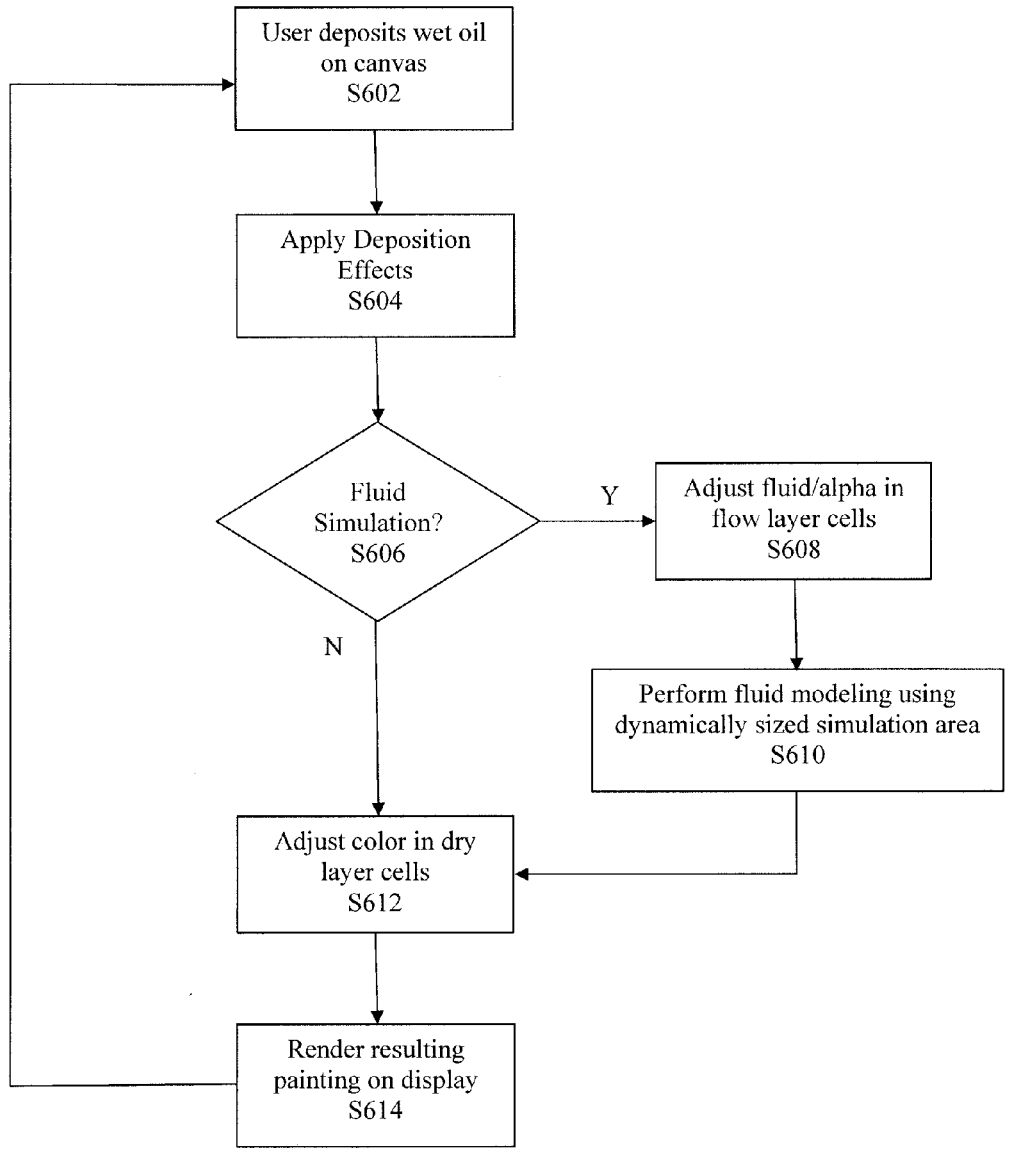
FIG. 6 is a flowchart illustrating an example methodology for performing painting simulation using wet oils and fluid modeling techniques according to embodiments of the invention.

One example implementation of a wet oil method according to embodiments of the invention is represented in the flowchart of FIG. 6.

In a first step S602, wet oil is deposited on the drawing area (e.g. by a user causing a paint brush having a selected color to be applied to a digital canvas in a computer art software application). In general, at each location where the brush is applied, fluid having the associated color is applied, and the alpha value of the color is increased the more times the brush is applied at the same location.

In embodiments such as that illustrated in FIG. 6, similar to watercolor embodiments, step S604 allows the user to control various additional parameters to get various effects for how the fluid and/or color is deposited. Example controls according to these and other embodiments of the invention (for deposition) include wetness and concentration. Example wetness effects control the relative amount of fluid that is deposited on the surface layer for each brush action. Example concentration effects control the relative alpha value for the color that is deposited per amount of fluid. This alpha value will control how the color is blended, as described further below.

In a next step S606 of an example method as shown in FIG. 6, it is determined whether a fluid simulation interval is to be performed. Similar to the watercolor embodiments, it should be noted that the timing of simulation can be controlled separately from other steps, but this is not necessary in all embodiments. For example, the user can manually cause the simulation to be paused, or simulation can be paused automatically while the user is actively engaged in a series of deposition actions that are performed close together in time.

If simulation is to be performed, a next step S608 includes adjusting the amount of fluid and/or color alpha values in each of the cells in the flow layer. For example, some or all of the media (fluid and color) recently deposited onto the surface layer can be transferred into the flow layer and therefore added to the simulation. In embodiments, at each cell in the flow layer the color from the corresponding cell in the surface layer is alpha blended with color in the flow layer. Alpha is reduced on the surface media in proportion with how much media is transferred, if not all of the media is transferred in this step.

In addition, some of the color already existing on the dry layer can be lifted and reintegrated into the flow layer. The alpha of the color of the dry oil is reduced (kind of inverse of alpha-blending) in proportion to the amount lifted, and the media picked up is alpha blended into the flow layer. This process can include additional parameters (such as paper texture) to simulate erosion or granulation.

After the fluid and/or color for each of the cells in the flow layer are adjusted, a next step S610 includes performing fluid simulation according to the invention as described above. It should be noted that, in addition to performing the dynamically sized simulation as described above, the fluid simulation formulas such as those included in LBM (e.g. controlling such variables as velocity, pressure, etc.) can be further adjusted according to achieve various effects in real-world wet oil painting, such as: Variable blur (to simulate blending of the media); Settling rate which adds transparency to the oil in the flow layer; and Movement of oil using velocity interpolation of the alpha and pixels. In embodiments, these effects can be selected/adjusted by the user. Accordingly, step S608 can include determining the effects to be used and adjusting the simulation formulas accordingly.

In a next step S612, regardless of whether simulation is performed, the method includes adjusting the color in the dry layer if necessary. For example, this can include wet oil effects such as erosion and drying, etc. This step recognizes that as the liquid evaporates, some of the oil will be blended to the dry surface. The rate of evaporation and the blend rate can be controlled by parameter, for example. Moreover, this process can incorporate other effects such as erosion, where some of the oil that is dried on the surface is lifted and blended back into the flow layer, or dissipated to simulate a medium such as turpentine. This effect can be dependent upon the amount of liquid in the flow layer. These effects can be selected and/or adjusted by a user. The amount of fluid in the flow layer can also be adjusted according to evaporation and absorption effects, which may be further selected and/or adjusted by a user.

In a next step S614, the results are used to cause the current canvas to be rendered on the screen. In three layer model embodiments, color values are alpha blended from top to bottom and the result is rendered to the screen. It should be noted that this step may include translating from one color space to another. For example, if color values are calculated in the simulation steps using YUV, and the display graphics use RGB, a YUV to RGB color space conversion may need to be included in this step.

In general, embodiments of the invention achieve various drawing/painting effects desirable in natural media simulation, which effects can be germane to any type of painting fluid, including the watercolor and wet oil embodiments described above. These effects include: evaporation (e.g. controlling the rate at which fluid in the flow layer is reduced); wind (e.g. adjusting the fluid velocity and/or pressure parameters in the LBM calculations); paper/canvas resistance (e.g. adjusting the movement of fluid in the flow layer caused by flow resistance caused by the paper or a user selected pattern and/or flow map); viscosity (e.g. the rate at which fluid can move); and paper absorption (e.g. an effect where the paper texture absorbs some of the fluid). Those skilled in the art will appreciate how these parameters can be used to affect the various method steps described in more detail above.

In addition to the effects above, embodiments also include user control over the simulation. The user can "pause" the simulation, and can even deposit media while it is paused. This control can cause the digital canvas to be rendered as changes are made to the surface layer by user action, independently of any changes to the flow layer caused by simulation of fluid movement. Also, the user can control how many iterations of the simulation are executed for each rendering of the simulation, as well as the time spent during each iteration. Rendering here refers to doing an update onscreen to give user feedback of the simulation. Those skilled in the art of computer graphics applications will appreciate how to implement these and other variations and features after being taught by the present examples.

As mentioned above, embodiments of the invention relate to new and useful tool adjustment paradigms that can be used in digital art applications. In these and other digital art application embodiments, during operation of the digital art application, a user can invoke a heads up display (HUD). The HUD allows the user to adjust parameters or properties of a tool (e.g. a brush). According to aspects of the invention, properties of a tool can be adjusted easily by states. For example, as in conventional applications, the user can switch through a list of different properties of a tool and adjust them using mouse movements. Where the tool is a brush, the user can adjust parameters of a brush as follows: the user starts in a default state (for example brush size), or the last used state; Moving a mouse or any other input device, in any direction, allows the user to make adjustments, getting live onscreen preview of brush size. However, in accordance with embodiments of the invention, while the HUD is still active a user can then switch states (e.g. using a keyboard, mouse click, anything that allows a state change to be detected) to adjust another parameter. The HUD remains on screen but the user now is adjusting another parameter such as the opacity (or angle, squeeze etc.) of the brush. The user can make live adjustments this way for any brush parameter, getting live feedback onscreen.

Aspects of these embodiments of the invention include the ability to adjust as many parameters as wanted by switching states.

In embodiments, the fluid modeling, drawing/painting simulation and tool adjustment paradigms of the invention finds new and useful applications in digital art software, such as PAINTER® from COREL®. Those skilled in the art will appreciate how to adapt such software with the functionality of the present invention after being taught by the present specification.

According to certain aspects, software according to the invention opens up a world of creativity. With an impressive array of brushes, paper textures, paints, oils, watercolors and more, if you can dream it, you can create it with the invention. With extensive file support, users can also build upon projects started in other programs, making software according to the invention a great complement to existing applications such as Adobe® Photoshop®.

Digital art software using aspects of the invention provide a most realistic digital painting experience. For example, the fluid modeling techniques of the invention represent a major milestone for digital painting, reproducing the movement and feeling of traditional art on canvas when paired with a graphics tablet. The new tool adjustment paradigm according to the invention can be incorporated therein, so as to streamline a user's brush selection, libraries, color controls and image set up. Support for the latest pen tablets from Wacom® is preferably included so as to give users exceptional freedom of movement.

Figure 7:
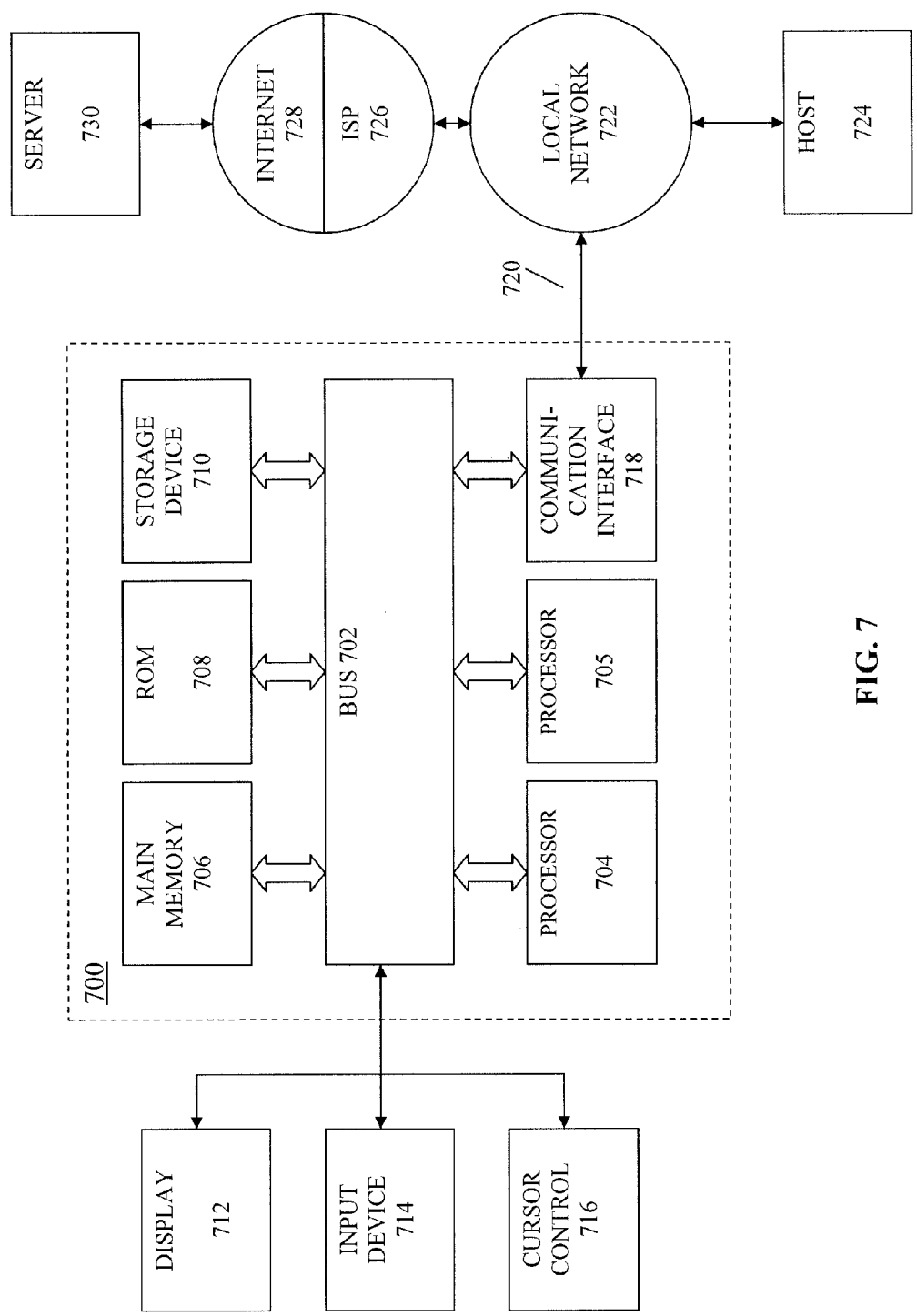
FIG. 7 is an example system for implementing embodiments of the invention.

FIG. 7 is a block diagram that illustrates a computer system 700 which can assist in implementing the digital art software methods disclosed herein. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a flat panel or touch panel display for displaying information to a computer user. An input device 714, such as a keyboard including alphanumeric and other keys, is coupled to bus 702 for communicating information and command selections to processor 704. Another type of user input device is cursor control 716, such as a mouse, a trackball, or cursor direction keys, or a tablet device such as those provided by Wacom, for communicating direction information and command selections to processor 704 and for controlling cursor movement on display 712. This input device typically has two degrees of freedom in two axes, a first axis (e.g., x) and a second axis (e.g., y), that allows the device to specify positions in a plane. A touch panel (screen) display may also be used as an input device (e.g. a panel incorporated in a tablet computer such as an iPad).

According to one embodiment of the invention, portions of the fluid modeling and/or drawing/painting simulation methods of the invention may be performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any non-transitory medium that participates in providing instructions to processor 704 for execution. Such a medium may take many forms, including but not limited to, non-volatile media and volatile media. Non-volatile media include, for example, optical or magnetic disks, such as storage device 710. Volatile media include dynamic memory, such as main memory 706. Common forms of computer-readable media include, for example, a floppy disk, a flexible disk, hard disk, magnetic tape, any other magnetic medium, a CD-ROM, DVD, any other optical or magnetic medium, a RAM, a PROM, and EPROM, a FLASH-EPROM, any other memory chip or cartridge, or any other non-transitory medium from which a computer can read.

Various forms of computer readable media may be involved in carrying one or more sequences of one or more instructions to processor 704 for execution. For example, the instructions may initially be borne on a magnetic disk of a remote computer. The remote computer can load the instructions into its dynamic memory and send the instructions over a telephone line using a modem. A modem local to computer system 700 (e.g. DSL modem) can receive the data on the telephone line and the data can eventually be placed on bus 702. Bus 702 carries the data to main memory 706, from which processor 704 retrieves and executes the instructions. The instructions received by main memory 706 may optionally be stored on storage device 710 either before or after execution by processor 704.

Computer system 700 also preferably includes a communication interface 718 coupled to bus 702. Communication interface 718 provides a two-way data communication coupling to a network link 720 that is connected to a local network 722. For example, communication interface 718 may be an integrated services digital network (ISDN) card or a modem (e.g. DSL modem) to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network, now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720, and communication interface 718. In the Internet example, a server 730 might transmit a requested code for an application program through Internet 728, ISP 726, local network 722 and communication interface 718. In accordance with the invention, one such downloaded application provides for the digital art software of the embodiment, for example. The received code may be executed by processor 704 as it is received, and/or stored in storage device 710, or other non-volatile storage for later execution.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method implemented by a computer comprising:
    establishing a closest fitting border of a predetermined geometry around a region of a computer generated surface, wherein the region of the computer generated surface is established in dependence upon an event within a digital art software application relating to simulation of an application of a liquid medium to a portion of the computer generated surface and the computer generated surface comprises a plurality of cells;
    expanding the closest fitting border of the predetermined geometry to form an expanded border by adding a predetermined number of cells around the closest fitting border, each added cell absent application of the liquid medium by the event;
    establishing within the expanded border a plurality of wet spans, each wet span defined as a continuous series of cells upon which the liquid medium has been applied;
    generating a data structure for the expanded border, the data structure identifying each wet span by the first cell and the last cell in the continuous series of cells; and
    generating a revision to the computer generated surface by simulating flow of the liquid medium according to a predetermined flow modelling process within the expanded border in dependence upon at least the data structure.

2. The method according to claim 1, wherein:
    the flow simulation is not performed on cells that are not within a wet span or adjacent a wet span; and
    the proportion of the computer generated surface modelled adjusts in response to the predetermined flow modelling process.

3. The method according to claim 1, further comprising:
    iterating the steps until a predetermined condition is met; and
    for each iteration replacing the region of the computer generated surface with a portion of the expanded boundary having cells with the liquid medium.

4. The method according to claim 1, further comprising:
    establishing a plurality of tiles, each tile comprising an array of cells; and
    establishing a portion of the tiles as wet tiles, each wet tile including a portion of a wet span,
    wherein generating the revision by simulating flow of the liquid medium is only performed on wet tiles.

5. The method according to claim 4, wherein
    simulating flow within a first wet tile can proceed concurrently with at least one of simulating flow within any other wet tile and the application of the liquid medium to any tile other than the first wet tile.

6. The method according to claim 1, wherein
    the digital art software application employs a multi-layer structure, wherein the application of the liquid medium is made to a first layer of the multi-layer structure, the fluid simulation is performed on a second layer of the multi-layer structure, and a pigment within the applied liquid medium is transferred from the second layer to a third layer which represents an impression made by the liquid medium application after the liquid medium has dried.

7. The method according to claim 6, wherein
    the event within a digital art software application relates to simulating a watercolouring process, and wherein a user can select a deposition method relating to the watercolouring process that directly deposits a pigment onto the third layer of the plurality of layers.

8. The method according to claim 1, further comprising:
    determining color values associated with each of the cells based upon an original color value prior to the application of the liquid medium, applying the liquid medium, and the flow simulation; and
    rendering at least the region of the computer generated surface for display to the user based upon original color values.

9. The method according to claim 1, further comprising:
    iterating the steps until a predetermined condition is met; and
    for each iteration replacing the region of the computer generated surface with that portion of the expanded boundary having cells with the liquid medium,
    wherein the user may pause the iterative process and execute another event within the digital art software application relating to another application of the liquid medium.

10. The method according to claim 1, wherein
    the flow simulation includes a natural effect selected from a group comprising evaporation, wind, flow resistance, viscosity and absorption.

11. The method according to claim 1, wherein
    the flow simulation includes a pigment effect selected from a group comprising settling rate, pigment weight, granulation and pick up.

12. A computer graphics system having a processor programmed with digital art software instructions, which when executed by the processor cause the processor to performing a method comprising:
    establishing a closest fitting border of a predetermined geometry around a region of a computer generated surface, wherein the region of the computer generated surface is established in dependence upon an event within a digital art software application relating to simulation of an application of a liquid medium to a portion of the computer generated surface and the computer generated surface comprises a plurality of cells;
    expanding the closest fitting border of the predetermined geometry to form an expanded border by adding a predetermined number of cells around the closest fitting border, each added cell absent application of the liquid medium by the event;
    establishing within the expanded border a plurality of wet spans, each wet span defined as a continuous series of cells upon which the liquid medium has been applied;
    generating a data structure for the expanded border, the data structure identifying each wet span by the first cell and the last cell in the continuous series of cells; and
    generating a revision to the computer generated surface by simulating flow of the liquid medium according to a predetermined flow modelling process within the expanded border in dependence upon at least the data structure.

13. The computer graphics system according to claim 12, wherein:
    the flow simulation is not performed on cells that are not within a wet span or adjacent a wet span; and
    the proportion of the computer generated surface modelled adjusts in response to the predetermined flow modelling process.

14. The computer graphics system according to claim 12, further comprising:
    iterating the steps until a predetermined condition is met; and for each iteration replacing the region of the computer generated surface with that portion of the expanded boundary having cells with the liquid medium.

15. The computer graphics system according to claim 12, further comprising:
   establishing a plurality of tiles, each tile comprising an array of cells; and
   establishing a portion of the tiles as wet tiles, each wet tile including a portion of a wet span,
   wherein generating the revision by simulating flow of the liquid medium is only performed on wet tiles.

16. The computer graphics system according to claim 15, wherein
   simulating flow within a first wet tile can proceed concurrently with at least one of simulating flow within any other wet tile and the application of the liquid medium to any tile other than the first wet tile.

17. The computer graphics system according to claim 12, wherein
   the digital art software application employs a multi-layer structure, wherein the application of the liquid medium is made to a first layer of the multi-layer structure, the fluid simulation is performed on a second layer of the multi-layer structure, and a pigment within the applied liquid medium is transferred from the second layer to a third layer which represents an impression made by the liquid medium application after the liquid medium has dried.

18. The computer graphics system according to claim 17, wherein
   the event within a digital art software application relates to simulating a watercolouring process, and
   wherein a user can select a deposition computer graphics system relating to the watercolouring process that directly deposits a pigment onto the third layer of the plurality of layers.

19. The computer graphics system according to claim 12, further comprising:
   determining color values associated with each of the cells based upon an original color value prior to the application of the liquid medium, applying the liquid medium, and the flow simulation; and
   rendering at least the region of the computer generated surface for display to the user based upon original color values.

20. The computer graphics system according to claim 12, further comprising:
   iterating the steps until a predetermined condition is met; and
   for each iteration replacing the region of the computer generated surface with a portion of the expanded boundary having cells with the liquid medium,
   wherein the user may pause the iterative process and execute another event within the digital art software application relating to another application of the liquid medium.

21. The computer graphics system according to claim 12, wherein
   the flow simulation includes a natural effect selected from a group comprising evaporation, wind, flow resistance, viscosity and absorption.

22. The computer graphics system according to claim 12, wherein
   the flow simulation includes a pigment effect selected from a group comprising settling rate, pigment weight, granulation and pick up.

* * * * *